(12) United States Patent
Rost et al.

(10) Patent No.: US 10,582,381 B2
(45) Date of Patent: Mar. 3, 2020

(54) IMPLEMENTING RADIO ACCESS NETWORK SLICING IN A MOBILE NETWORK

(71) Applicant: Nokia Solutions and Networks GmbH & Co. KG, Munich (DE)

(72) Inventors: Peter Rost, Heidelberg (DE); Andreas Maeder, Wurzburg (DE); Christian Mannweiler, Neubiberg (DE); Cinzia Sartori, Pullach (DE)

(73) Assignee: Nokia Solutions and Networks GMBH & Co. KG, Munich (DE)

( * ) Notice: Subject to any disclaimer, the term of this patent is extended or adjusted under 35 U.S.C. 154(b) by 12 days.

(21) Appl. No.: 16/091,631

(22) PCT Filed: Apr. 4, 2017

(86) PCT No.: PCT/EP2017/057935
§ 371 (c)(1),
(2) Date: Oct. 5, 2018

(87) PCT Pub. No.: WO2017/174550
PCT Pub. Date: Oct. 12, 2017

(65) Prior Publication Data
US 2019/0159024 A1      May 23, 2019

Related U.S. Application Data

(60) Provisional application No. 62/318,406, filed on Apr. 5, 2016.

(51) Int. Cl.
*H04W 12/04* (2009.01)
*H04W 76/15* (2018.01)
(Continued)

(52) U.S. Cl.
CPC . *H04W 12/04033* (2019.01); *H04W 12/0051* (2019.01); *H04W 16/00* (2013.01);
(Continued)

(58) Field of Classification Search
CPC ............... H04B 7/2121; H04B 7/2123; H04J 2203/0069; H04Q 2213/394; H04W 72/04;
(Continued)

(56) References Cited

U.S. PATENT DOCUMENTS

2018/0337822 A1* 11/2018 Heimes ............... H04L 61/2038
2019/0141081 A1*  5/2019 Kunz .................... H04W 4/70
(Continued)

OTHER PUBLICATIONS

3GPP TS 23.501 V0.3.1 (Mar. 2017), "$3^{rd}$ Generation Partnership Project; Technical specification Group Services and System Aspects; System Architecture for the 5G System; System 2 (Release 15)", 97 pgs.
3GPP TR 22.891 V1.3.1 (Feb. 2016), "$3^{rd}$ Generation Partnership Project; Technical specification Group Services and System Aspects; Feasibility Study on New Services and Markets Technology Enablers; Stage 1 (Release 14)", 97 pgs.
(Continued)

*Primary Examiner* — Sharad Rampuria
(74) *Attorney, Agent, or Firm* — Harrington & Smith

(57) ABSTRACT

In one example, requirement(s) are determined for data flows though different logical instances of mobile networks. The data flows are between UE(s) and the logical instances of the mobile networks. Information for the determined requirement(s) is sent to a multiple node controller to allow the multiple node controller to output information to enable configuration of RRC. The configuration causes the RRC to cause radio subflow(s), which flow through different radio legs and to the UE(s), to satisfy the requirement(s). In another example, mapping is received that maps different logical instances of mobile networks and their associated service flows to radio subflows that flow through different radio legs and to UE(s). The radio subflows, which flow through different radio legs and to the UE(s), are caused to
(Continued)

satisfy the requirement(s) for the data flows. Apparatus, methods, programs, and program products are disclosed.

20 Claims, 11 Drawing Sheets

(51) Int. Cl.
　　*H04W 16/00*　　(2009.01)
　　*H04W 76/11*　　(2018.01)
　　*H04W 76/27*　　(2018.01)
　　*H04W 12/00*　　(2009.01)
　　*H04W 72/04*　　(2009.01)
　　*H04W 84/04*　　(2009.01)

(52) U.S. Cl.
　　CPC ........ *H04W 72/0453* (2013.01); *H04W 76/11* (2018.02); *H04W 76/15* (2018.02); *H04W 76/27* (2018.02); *H04W 84/042* (2013.01)

(58) Field of Classification Search
　　CPC ............... H04W 72/12; H04W 76/00; H04W 12/04033; H04W 16/00; H04W 72/0453; H04W 12/0051; H04W 76/27; H04W 76/11; H04W 76/15; H04W 84/042
　　See application file for complete search history.

(56) References Cited

U.S. PATENT DOCUMENTS

2019/0246277 A1\* 8/2019 Hamzeh ................ H04W 12/04
2019/0258782 A1\* 8/2019 Lerner ................. H04L 63/101

OTHER PUBLICATIONS

3GPP TR 23.799 V0.3.0 (Mar. 2016), "3$^{rd}$ Generation Partnership Project; Technical specification Group Services and System Aspects; Study on Architecture for Next Generation System (Release 14)", 52 pgs.

NGMN 5G White Paper, version 1.0, © 2015 Next Generation Mobile Networks Ltd., paras. 4.3.1, 5.3.3, and 5.5, 8 pgs.

3GPP TR 22.951 V13.0.0 (Dec. 2015), "3$^{rd}$ Generation Partnership Project; Technical specification Group Services and System Aspects; Service aspects and requirements for network sharing (Release 13)", 19 pgs.

3GPP TS 23.251 V8.2.0 (Mar. 2010), "3$^{rd}$ Generation Partnership Project; Technical Specification Group Services and System Aspects; Network Sharing; Architecture and functional description (Release 8)", 20 pgs.

3GPP TR 32.851 V12.1.0 (Dec. 2013), 3$^{rd}$ Generation Partnership Project; Technical Specification Group Services and System Aspects; Telecommunication management; Study on Operations, Administration and Maintenance (OAM) aspects of Network Sharing (Release 12), 38 pgs.

3GPP TS 23.401 V13.5.0 (Dec. 2015), "3$^{rd}$ Generation Partnership Project; Technical specification Group Services and Systems Aspects; General Packet Radio Service (GPRS) enhancements for Evolved Universal Terrestrial Radio Access Network (E-UTRAN) access (Release 13)", 337 pgs.

ETSI TS 136 300 V12.8.0 (Jan. 2016) (3GPP TS 36.300 V 12.8.0 Release 12), "LTE; Evolved Universal Terrestrial Radio Access (E-UTRA) and Evolved Universal Terrestrial Radio Access Network (E-UTRAN); overall description stage 2", 261 pgs.

\* cited by examiner

FIG 3
FIG 3B
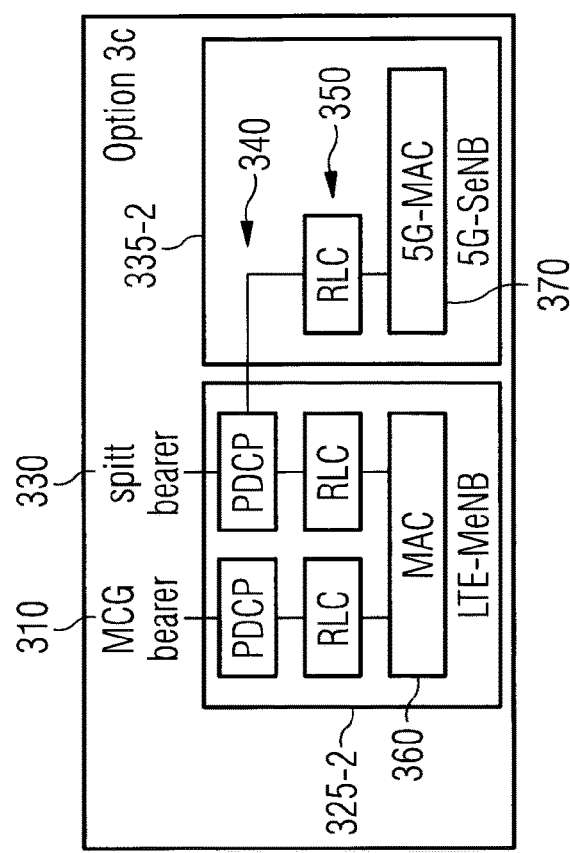
FIG 3A
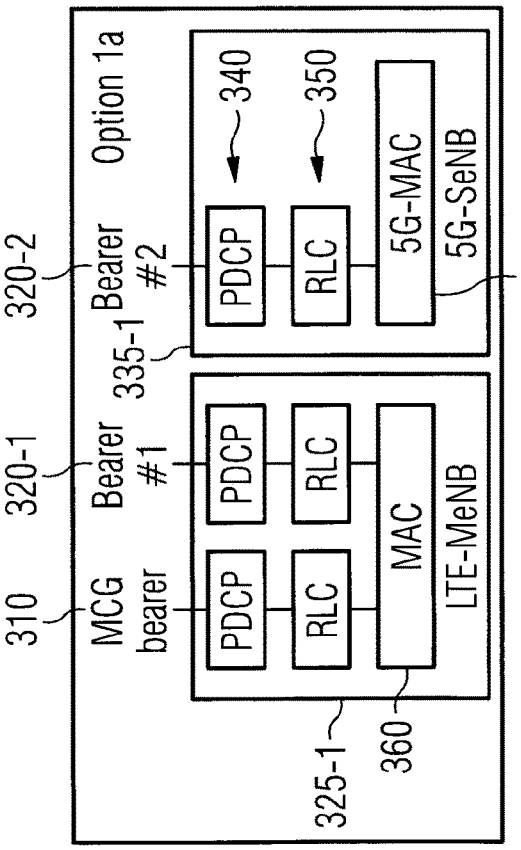

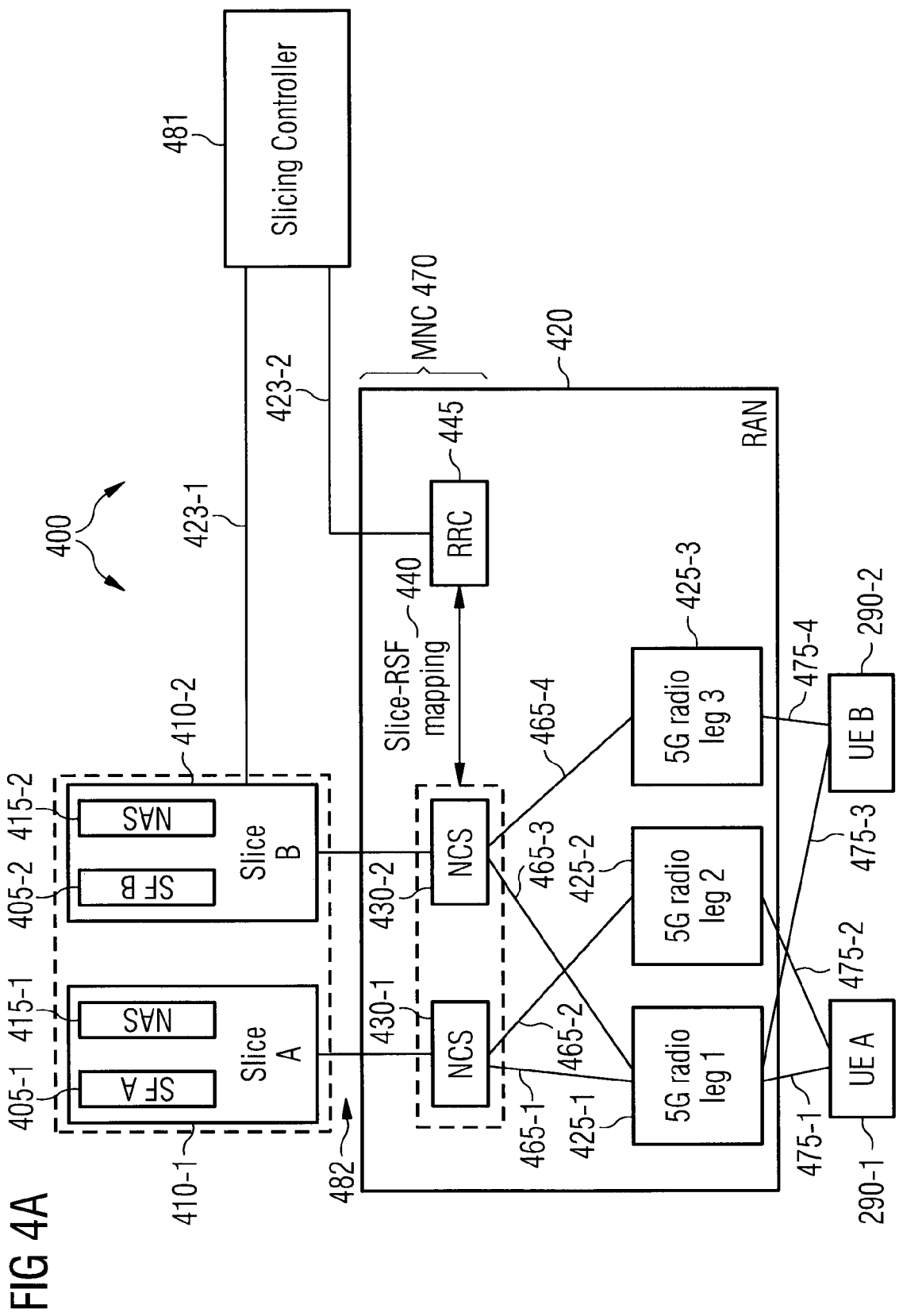

IMPLEMENTING RADIO ACCESS NETWORK SLICING IN A MOBILE NETWORK

This patent application is a U.S. National Stage application of international Patent Application Number PCT/EP2017/057935 filed Apr. 4, 2017, and claims priority to U.S. provisional application 62/318,406 filed Apr. 5, 2016, which are hereby incorporated by reference in their entireties.

TECHNICAL FIELD

This invention relates generally to mobile network architectures and, more specifically, relates to how different "logical instantiations" of mobile networks can be supported over a fully or partially shared infrastructure.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

As a UE traverses cellular networks, the UE interacts with many different RANs. The UE could interact with RANs from different operators, for instance, and/or with RANs having different bearers or air interfaces, and/or with RANs from different cells (e.g., large cells commonly called macro cells, or small cells). These different RANs can be thought of as different "logical instantiations" of mobile networks, which can be supported over a fully or partially shared (e.g., by different operators) infrastructure. These logical instances (often denoted as herein as "network slices" or simply "slices") can be tailored for different use cases and services, depending on the customers' requirements.

In general, a mobile network may have to support very different use cases which vary in their required connectivity (or coverage), robustness (or frame errors), throughput, latency, mobility pattern, and/or number of connected devices. Each use case may require different technologies in order to satisfy the demands of one or multiple UEs.

Current approaches for RAN sharing (e.g., multi-operator RAN, MORAN) exhibit limited flexibility, scaling, and customization characteristics and therefore do not enable operation of multiple logical mobile networks (each addressing a particular use case) in the RAN domain.

BRIEF SUMMARY

This section is intended to include examples and is not intended to be limiting.

In an exemplary embodiment, a method comprises the following: determining one or more requirements for data flows though different logical instances of mobile networks, wherein the data flows are between user equipment and the logical instances of the mobile networks; and sending information for the determined one or more requirements to a multiple node controller to allow the multiple node controller to output information to enable configuration of radio resource control, the configuration causing the radio resource control to cause one or more radio subflows, which flow through different radio legs and to the user equipment, to satisfy the one or more requirements for the data flows.

In another exemplary embodiment, a method comprises the following: receiving information corresponding to one or more requirements for data flows though different logical instances of mobile networks, wherein the data flows are between user equipment and the logical instances of the mobile networks; and configuring radio resource control such that the radio resource control causes one or more radio subflows, which flow through different radio legs and to the user equipment, to satisfy the one or more requirements for the data flows.

A further exemplary embodiment is a method. The method comprises the following: receiving mapping that maps different logical instances of mobile networks and their associated service flows to radio subflows that flow through different radio legs and to user equipment, wherein the radio subflows correspond to data flows between the user equipment and the logical instances of the mobile networks, and wherein each data flow has one or more requirements; and causing one or more radio subflows, which flow through different radio legs and to the user equipment, to satisfy the one or more requirements for the data flows.

Another exemplary embodiment is a computer program comprising program code for executing the method according to the previous paragraphs. A further example is the computer program according of this paragraph, wherein the computer program is a computer program product comprising a computer-readable medium bearing computer program code embodied therein for use with a computer.

In a further example, an apparatus comprises at least one processor, and at least one memory including computer program code. The at least one memory and the computer program code are configured to, with the at least one processor, cause the apparatus to perform the method of any of the methods in the previous paragraphs.

An additional exemplary embodiment is an apparatus, comprising: means for determining one or more requirements for data flows though different logical instances of mobile networks, wherein the data flows are between user equipment and the logical instances of the mobile networks; and means for sending information for the determined one or more requirements to a multiple node controller to allow the multiple node controller to output information to enable configuration of radio resource control, the configuration causing the radio resource control to cause one or more radio subflows, which flow through different radio legs and to the user equipment, to satisfy the one or more requirements for the data flows.

A further exemplary embodiment is an apparatus. The apparatus comprises the following: means for receiving information corresponding to one or more requirements for data flows though different logical instances of mobile networks, wherein the data flows are between user equipment and the logical instances of the mobile networks; and means for configuring radio resource control such that the radio resource control causes one or more radio subflows, which flow through different radio legs and to the user equipment, to satisfy the one or more requirements for the data flows.

An additional exemplary embodiment is an apparatus, comprising: means for receiving mapping that maps different logical instances of mobile networks to radio subflows that flow through different radio legs and to user equipment, wherein the radio subflows correspond to data flows between the user equipment and the logical instances of the mobile networks, and wherein each data flow has one or more requirements; and means for causing one or more radio subflows, which flow through different radio legs and to the user equipment, to satisfy the one or more requirements for the data flows.

A further example is a communication system comprising any of the apparatus described in this section.

BRIEF DESCRIPTION OF THE DRAWINGS

In the attached Drawing Figures:

FIG. 3 shows two options specified in LTE Rel. 12 for dual connectivity, where FIG. 3A is an illustration of Option 1a for LTE dual connectivity and where FIG. 3B is an illustration of Option 3c for LTE dual connectivity;

FIG. 4 includes both FIG. 4A and FIG. 4B, where FIG. 4A is an example of a system for implementing radio access network slicing in a mobile network, in accordance with an exemplary embodiment, and where

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As noted above, a mobile network may have to support very different use cases and each use case may require different technologies in order to satisfy the demands of one or multiple UEs. One difficulty is the mapping of different logical mobile networks to a multi-connectivity setup with appropriate parameterization in order to guarantee quality of service requirements of each logical mobile network (e.g., slice) in general as well as the service flow specific requirements of single UEs in particular. A logical instantiation of a mobile network, briefly referred to herein as "logical mobile network" (or "slice"), forms a self-contained and complete mobile network. While this network is comprised of all required (3GPP) functionality to operate as a dedicated mobile network, the network can at the same time share infrastructure resources and functions with other logical mobile network instantiations.

Further, for the purpose of isolation, different security contexts may apply. Each service flow might require a separate security context for integrity protection and encryption.

Exemplary embodiments herein serve as enablers for operating multiple logical mobile networks (each addressing a particular use case) in the RAN domain. Exemplary embodiments may also guarantee the quality of service requirements of mobile networks and the service flow specific requirements of single UEs.

The exemplary embodiments herein address operating multiple logical mobile networks using the same radio access network infrastructure. In particular, the exemplary embodiments consider a case where a user terminal (referred to as a UE herein) connects, through different radio legs, to different network slices. Different radio legs may mean the following:

1) Different air interface technologies;
2) Different physical radio access points (using the same or different air interface technologies); and
3) Different carrier frequencies.

In the following, the above list is referred to as a general 'multi-connectivity' setup.

Before proceeding with description of the exemplary embodiments, some additional introduction is presented.

Figure 1:
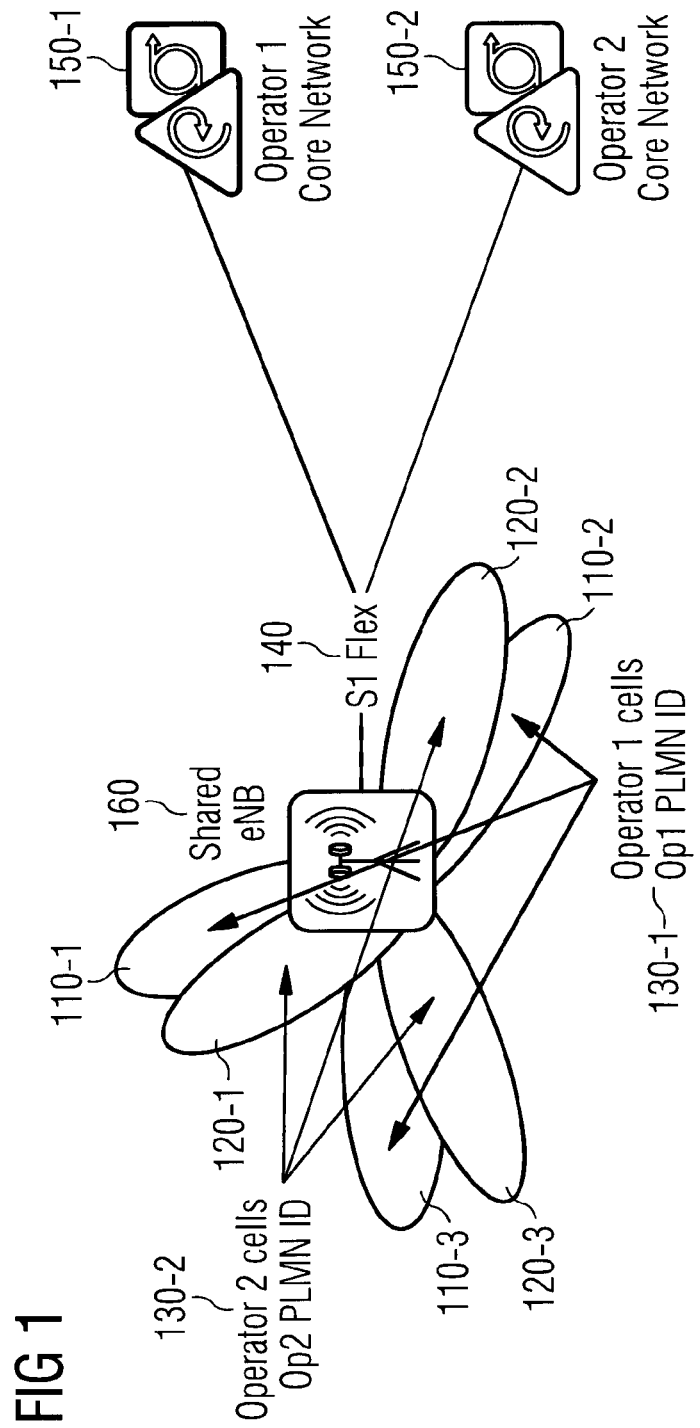
FIG. 1 illustrates basic features of a MORAN-enabled LTE access network.

In terms of one possible technique for operating multiple logical mobile networks using the same radio access network infrastructure, there is the multi-operator RAN (MO-RAN). This exploits the concept of network sharing. See 3GPP TR 32.851 V12.1.0, "Study on Operations, Administration and Maintenance (OAM) aspects of Network Sharing", December 2013; and 3GPP TS 23.251 V8.2.0, "Network sharing; Architecture and functional description", March 2010. FIG. 1 illustrates basic features of a MORAN-enabled LTE access network, where Operator 1 operates cells 110-1, 110-2, and 110-3 and has a core network (CN) 150-1, Operator 2 operates cells 120-1, 120-2, and 120-3 and has a CN 150-2, and the two CNs 150 are connected to their operator's corresponding cells 110/120 via the S1 Flex interface 140. The cells 110, 120 are formed by the shared eNB 160. This MORAN-enabled LTE access network could use the following basic configuration, as illustrated by FIG. 1:

An LTE six cell configuration 2+2+2, where each operator has one cell 110 or 120 per sector.

The eNB 160 is configured so that each cell 110/120 broadcasts the Primary PLMN plus the dedicated PLMN for that cell. The dedicated PLMNs are illustrated as PLMN ID 130-1 for Operator 1 (Op 1) and PLMN ID 130-2 for Operator 2 (Op 2).

The S1 flex interface 140 needs to be enabled.

Each operator sharing the RAN has its own core network 150, i.e. the core network does not need to support (be aware of) MORAN.

Two separate LTE carriers are supported by one RF Module or RRH within one 3GPP RF band.

One RF Module or RRH supports two LTE cells at one RF band simultaneously per RF sector (TX/RX and RX pipe).

In this example, shared resources include one or more of the following: transport interface (resource splitting); eNB hardware; baseband capacity; feeder cables and antennas (using a combiner if needed); server racks, power supply and batteries at an eNB level.

The following resources are dedicated: cell level parameter settings (e.g., a dedicated PLMN is broadcasted); licensed frequencies; S1 interfaces; and EPC and services.

It is noted that further MORAN variants with varying levels of sharing exist. However, in contrast to the techniques presented herein, those variants support neither 5G multi-connectivity scenarios nor UE attachment to multiple logical networks. Rather, one UE connects to a single operator's PLMN.

Another possible technique for operating multiple logical mobile networks using the same radio access network infrastructure is MOCN (Multi-Operator Core Network). MOCN for LTE has been standardized in 3GPP since Rel. 8. See the following: 3GPP TS 23.251 V8.2.0, "Network sharing: Architecture and functional description", March 2010; 3GPP TS 23.401 V13.5.0, "General Packet Radio Service (GPRS) enhancements for Evolved Universal Terrestrial Radio Access Network (E-UTRAN) access," December 2015; and 3GPP TR 22.951, V13.0.0, "Service aspects and requirements for network sharing," January 2016. In MOCN, the eUTRAN is common to several mobile network operators and shared between them.

Figure 2:
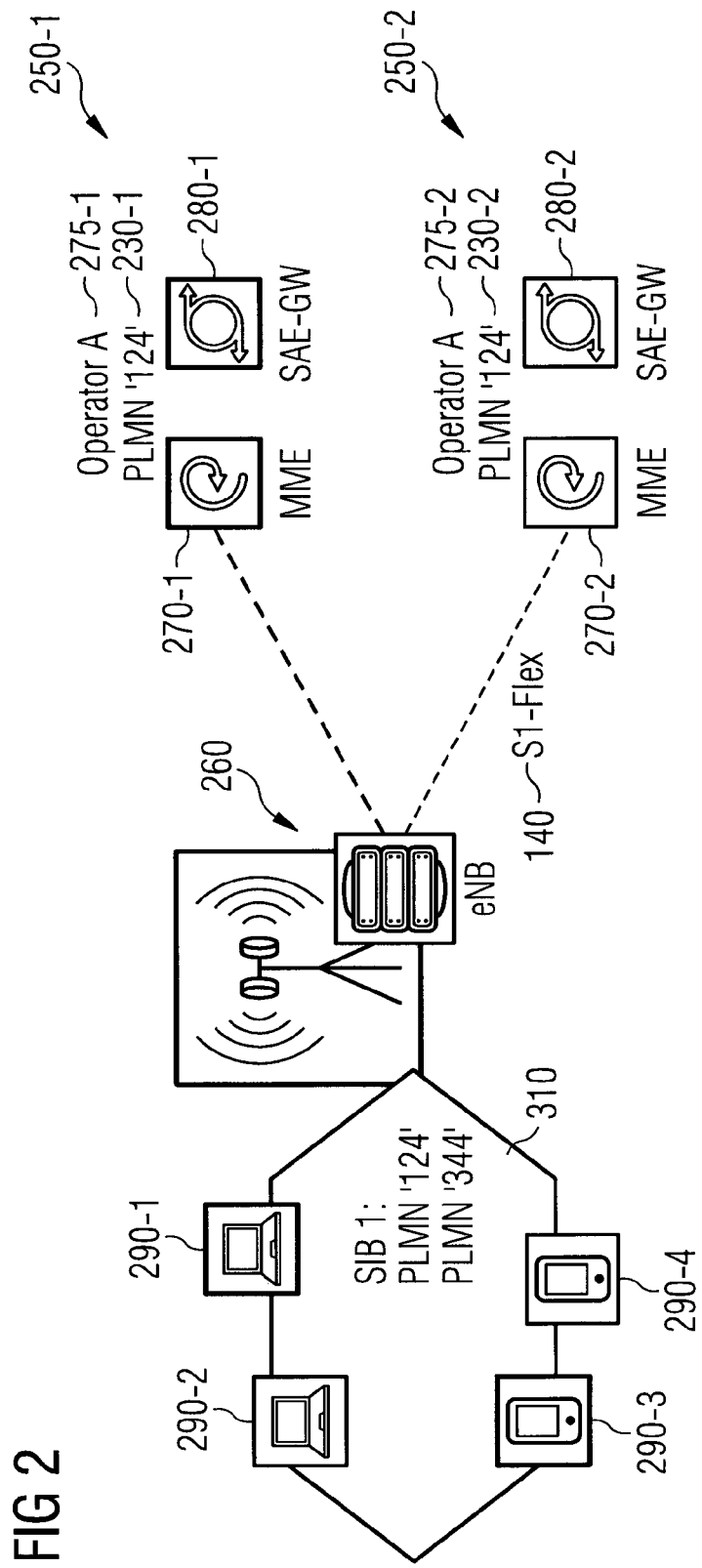
FIG. 2 is an example of MOCN.

FIG. 2 is an example of MOCN. The shared eNodeB 260 is connected to multiple CNs 250-1, 250-2 via the S1 flex interface 140. Each mobile network operator 275 (of which Operator A 275-1 and Operator B 275-2 are shown) has its own EPC (i.e., its own core network 250-1, 250-2, respectively) and the S1 flex interface 140 allows the eNodeB 260 to be connected to different CNs 250. The CN 250-1 in this example includes an MME 270-1 and an SAE-GW 280-1, and the CN 250-2 includes an MME 270-2 and SAE-GW 280-2. There is a cell 310 having four UEs 290-1 (a computer system), 290-2 (another computer system), 290-3 (a smartphone), and 290-4 (another smartphone). Operator A 275-1 uses PLMN ID 230-1 (PLMN 124) and operator B 275-2 uses PLMN ID 230-2 (PLMN 344).

In terms of network selection, the PLMN IDs 230 of different mobile network operators 275 are broadcasted on the air in the System Information Block (SIB). In total up to six PLMNs can be broadcasted in SIB1. The user equipment (UE) 290 decodes system information and performs PLMN ID selection. The finally selected PLMN ID 230 is specified in an RRC connection procedure.

The eNodeB 260 uses the selected PLMN ID 230 to forward an attachment request to an MME 270 belonging to the correct PLMN. In order to fulfil the Service Level Agreement (SLA) between eUTRAN and different CN operators (e.g., an excess of traffic of one CN operator may lead to a violation of SLA of another operator sharing the eUTRAN), non-standard features are provided by vendors, e.g., with resource reservation and smart scheduler on the transport side, different VLANs on S1 and X2 may provide separation between CN operators 275 and the shared eNodeB 260. Since neighbor cells are common for both operators 275, mobility is provided by proprietary features.

Concerning LTE dual connectivity, which is also known as inter-site carrier aggregation, this is used to achieve carrier aggregation between sites. This is an attractive solution for Heterogeneous Networks (HetNets) with no ideal backhaul network. Dual connectivity allows mobility management to be maintained on the macro layer while aggregating small cells to provide extra user plane capacity.

With regard to dual connectivity, FIG. 3 shows the two options specified in LTE Rel. 12, where FIG. 3A is an illustration of Option 1a for LTE dual connectivity and where FIG. 3B is an illustration of Option 3c for LTE dual connectivity. In Option 1a of FIG. 3A, there is master eNB (MeNB) 325-1 and a secondary eNB (SeNB) 335-1, and in Option 3c, there is a MeNB 325-2 and an SeNB 335-2. The MeNB 325-1 for Option 1a includes a PDCP layer 340 and an RLC layer 350 for each of the MCG bearer 310 and bearer #1 320-1, and a MAC layer 360, while the SeNB 335-1 for Option 1a includes a PDCP layer 340 and RLC layer 350 for bearer #2 320-2, and a 5G-MAC layer 370. The MeNB 325-2 for Option 3c includes a PDCP layer 340 and an RLC layer 350 for each of the MCG bearer 310 and the split bearer 330, and a MAC layer 360, while the SeNB 335-2 for Option 3c does not include a PDCP layer 340 (instead, the PDCP layer for the split bearer 330 is routed to the RLC layer 350) and includes an RLC layer 350 for the split bearer 330, and a 5G-MAC layer 370.

In both options, the user plane is split between the MeNB 325, typically a macro cell, and the SeNB 335, typically a small cell. In Option 1a, the user plane is conveyed either to bearer #1 320-1 or bearer #2 320-2, while in Option 3c the data bearer split/aggregation is performed in the macro cell. The radio signaling bearer is always terminated in the macro cell.

Regarding terminology, the term "multi-connectivity" refers to a RAN feature where a single UE is configured with resources in different radios (e.g., radio cells). In case of 3GPP, the dual connectivity feature has been described above. The Packet Data Convergence Protocol (PDCP) serves as the aggregation layer and anchor for this kind of multi-connectivity option, configured and controlled by the Radio Resource Control (RRC) function. See, e.g., 3GPP, "TS 36.300 V12.8.0; Evolved Universal Terrestrial Radio Access (E-UTRA) and Evolved Universal Terrestrial Radio Access Network (E-UTRAN); Overall description", January 2016. In 5th Generation (5G) mobile networks, a new layer called Network Convergence Sublayer (NCS) may be introduced with a similar scope as PDCP for multi-connectivity. Both terms can be used as synonyms in the following. It is further noted that NCS may be considered to be a combination of a PDCP instance and a SDAP instance.

Further concepts with a similar scope in 5G and in LTE are the following:

Service flow (SF) and EPS bearer in LTE, which both denote a logical end-to-end connection with specific service properties (i.e., between user equipment (UE) in the access network to a user-plane gateway (e.g., PDN-Gateway) in the mobile core network); In 5G, a service flow corresponds to QoS flow (see 3GPP TS 23.501 V0.3.1);

Radio flow (RFL) and radio-subflow (RSF), which corresponds to an enhanced concept of radio bearer in LTE, or Data Radio Bearer (DRB) in 5G.

MNC, which corresponds to a Centralized Unit (CU) in 5G architecture scope, see e.g. TR 38.801 V2.0.0.

The exemplary embodiments herein provide techniques for implementing radio access network slicing in a mobile network. Additional detail regarding these techniques is presented after an example is presented of a system for implementing radio access network slicing in a mobile network. Turning to FIG. 4A, this figure illustrates the RRC and NCS as being the multi-connectivity and network slicing anchor. The network 400 includes multiple slices 410-1 and 410-2, a RAN 420, and a slicing controller 481. Note that there is only one physical RAN 420 (that is, one RAN that communicates wirelessly with the UEs 290), but there could be multiple logical RANs (e.g., for the slices 410) that can be hosted.

Figure 6:
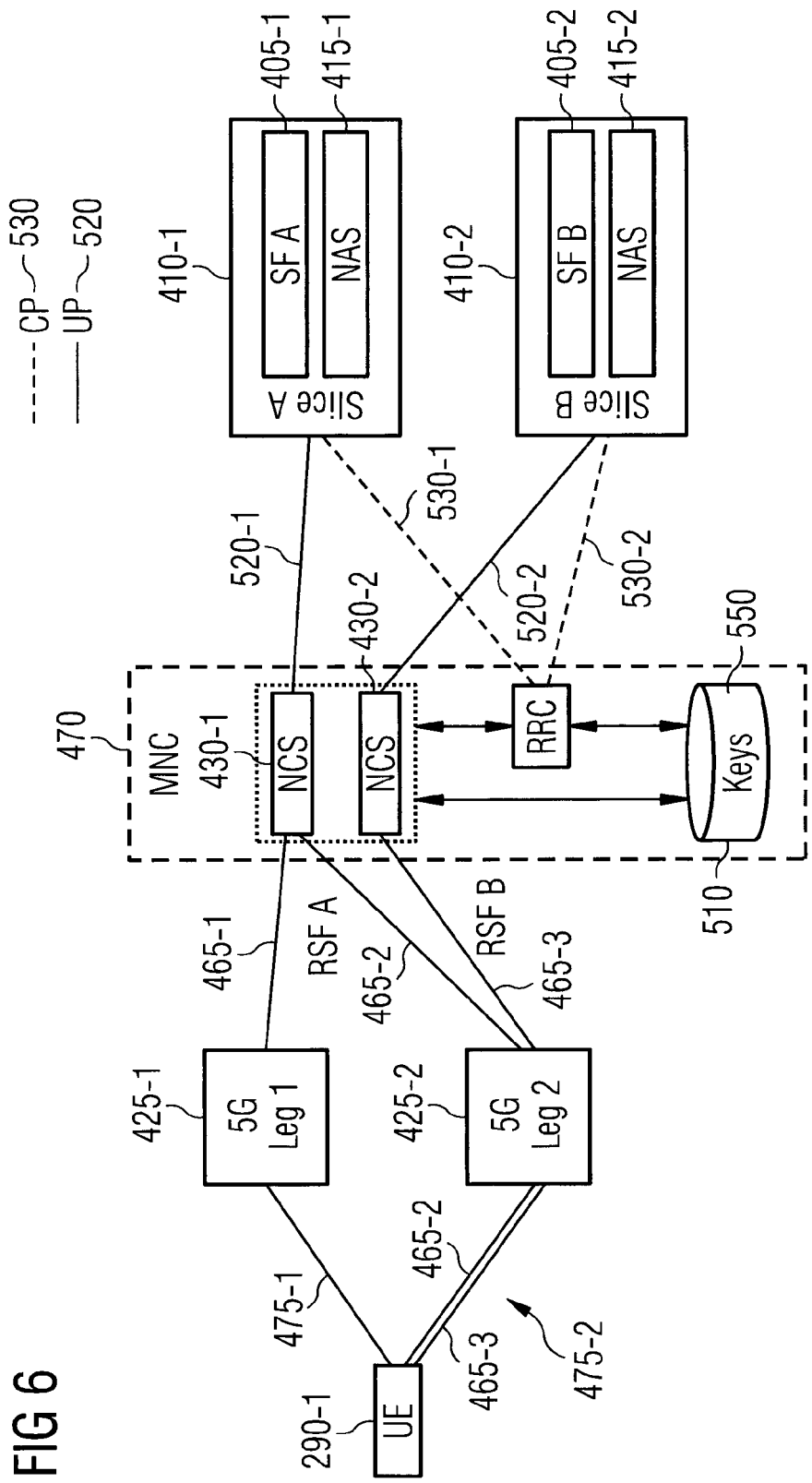
FIG. 6 is an example that MC within each slice can be supported as well, in accordance with an exemplary embodiment.

By way of introduction, in FIG. 4A, the RAN 420 is divided into a MNC (Multi-Node Controller) 470 and multiple 5G radio legs 425. This is a concept where the "upper" parts (e.g., toward the CN) of a base station are dislocated from the "lower" parts (e.g., toward the radio interface with the UE, what is drawn as "5G radio legs 425" in the figures). However, the whole concept is in principle independent from whether there is an MNC 470 or not, because the functional entities (RRC, NCS, etc.) are also available in a normal base station. In one example, a base station is therefore the MNC 470 and lower radio leg(s) 425. However, the concept of slicing is independent of the actual structure of the network (e.g., whether there is a base station, or some distributed or cloud RAN deployment). It is only important that there are functional entities (NCS, RRC, and the like) that are configured according to the slicing policies, which are provided by the slice controller 481 (as described in more detail below). FIG. 6, described below, illustrates another example, where the "MNC 470" is shown as a special case of realization of the radio access network.

The slicing controller 481 can be: 1) co-located with a RAN processor, i.e., an entity (illustrated in reference 420) which processes RAN signals; or 2) connected through any communication link with RAN processing equipment. In the example of FIG. 4, the slicing controller is separate from the RAN (as in (2)), but could be incorporated with/co-located with the RAN 420 (as in (1)). The slicing controller 481 is used to implement RAN slicing in exemplary embodiments.

The slices 410 are different logical mobile networks. Slice A 410-1 includes a SF A 405-1 and a NAS 415-1, and slice B 410-2 includes SF B 405-2 and NAS 415-2. The slices 410 communicate with the RAN 420 via the links 482, which may be wired or wireless. The RAN 420 includes NCS 430-1 (operating with slice A 410-1) and NCS 430-2 (operating with slice B 410-2) and also RRC function 445. The NCS 430-1 interacts with 5G radio leg 1 425-1 and 5G radio leg 2 425-2 and the NCS 430-2 interacts with 5G radio leg 1 425-1 and 5G radio leg 3 425-3. UE A 290-1 interacts with 5G radio legs 425-1 and 425-2 via radio links 475-1 and 475-2, respectively, and via RSFs 465-1 and 465-2, respectively. UE B 290-2 interacts with 5G radio legs 425-1 and 425-3 via radio links 475-3 and 475-4, respectively and via RSFs 465-3 and 465-4, respectively. Thus, UE A 290-1 interacts with slice A 410-1 (through the 5G radio legs 425-1 and 425-2 and NCS 430-1), and the UE B 290-2 interacts with slice B 410-2 (through the 5G radio legs 425-1 and 425-3 and NCS 430-2). It should be noted that the NCS instances 430 are not necessarily co-located. That is, the NCS instance 430 may not necessary performed on the same processor or even the same computer. Instead, NCS instances 430-1 and 430-2 may be performed by two separate computers, e.g., at different physical locations.

Figure 4B:
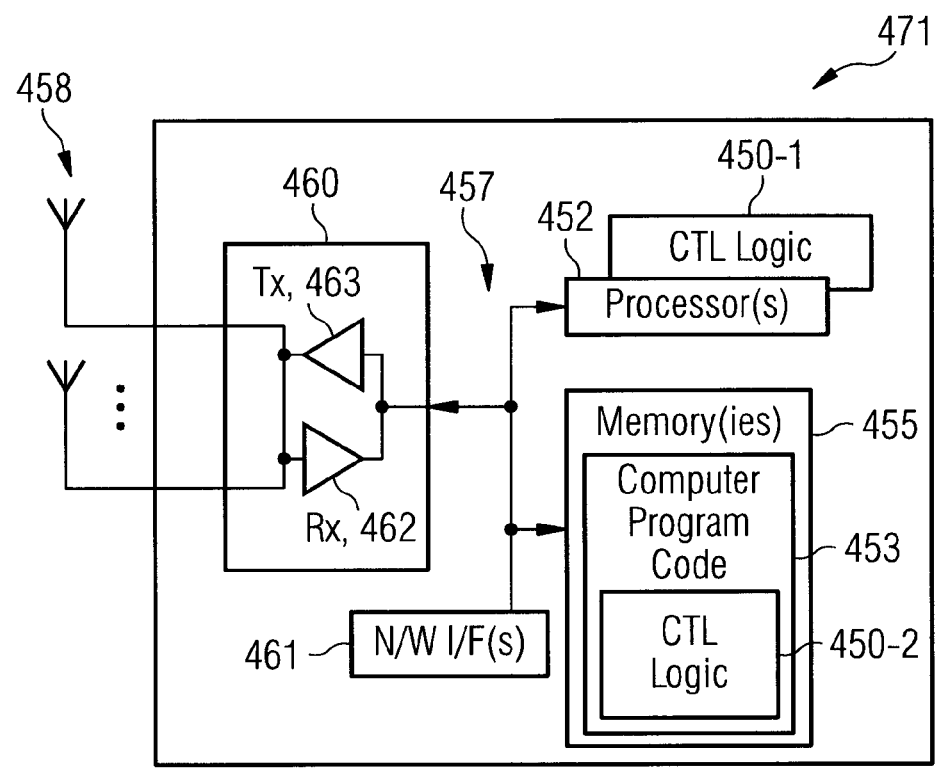
FIG. 4B is an example of a device suitable for implementing a slicing controller, RRC processor, MNC, or radio leg.

The elements of FIG. 4A may be implemented in a number of ways. FIG. 4B is an example of a device suitable for implementing a slicing controller, RRC processor, MNC, or radio leg. In this example, the device 471 may communicate using one or both of wired and wireless communications, although the device 471 can be limited to one of those if required. The device 471 includes one or more processors 452, one or more memories 455, one or more network interfaces (N/W I/F(s)) 461, and one or more transceivers 460 interconnected through one or more buses 457. Each of the one or more transceivers 460 includes a receiver, Rx, 462 and a transmitter, Tx, 463. The one or more transceivers 460 are connected to one or more antennas 458. The one or more memories 455 include computer program code 453. The device 471 includes CTL (control) logic 450, comprising one of or both parts 450-1 and/or 450-2, which may be implemented in a number of ways. The CTL logic 450 may be implemented in hardware as CTL logic 450-1, such as being implemented as part of the one or more processors 452. The CTL logic 450-1 may be implemented also as an integrated circuit or through other hardware such as a programmable gate array. In another example, the CTL logic 450 may be implemented as CTL logic 450-2, which is implemented as computer program code 453 and is executed by the one or more processors 452. For instance, the one or more memories 455 and the computer program code 453 are configured to, with the one or more processors 452, cause the device 471 to perform one or more of the operations as described herein. The one or more network interfaces 461 communicate over a network such as via the links 423-1 and 423-2. The links 423-1 and 423-2 may be wired or wireless and communication over these may be via the network interface(s) 461 and/or the transceiver(s) 460.

The computer readable memories 455 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 455 may be means for performing storage functions. The processors 452 may be of any type suitable to the local technical environment, and may include one or more of general purpose computers, special purpose computers, microprocessors, digital signal processors (DSPs) and processors based on a multi-core processor architecture, as non-limiting examples. The processors 452 may be means for performing functions, such as controlling the MNC 470, and other functions as described herein.

For instance, the slicing controller 481 may be separate from the RAN 420 and communicate with the RAN using N/W I/F 461 and not use wireless. The slicing controller 481 in this example would not use or contain the antennas 458 or the transceiver 460. The MNC 470/RRC function 445 may also communicate with the slicing controller 481, slices 410, and radio legs 425 via (e.g., multiple) N/W I/F(s) 461 and therefore also not use or contain the antennas 458 or the transceiver 460. The links 423, 482, and those used for RSFs 465 are wired. Meanwhile, the radio legs 425 would contain all the elements of the device 471 illustrated in FIG. 4B, and the transceiver(s) 460 are used to wirelessly communicate with the UEs 290. Many other combinations and configurations are possible.

Additional examples and details are presented using FIGS. 4A and 4B. A mobile network in this example comprises radio access points, a transport network (not shown here but would connect to one or more radio access points with the mobile network), core network entities (e.g., the NAS 415 as part of a corresponding core network), and user terminals. It is expected that one radio access point would implement at least one of the 5G radio legs 1, 2, and 3. As such, FIG. 4A illustrates a logical network more than a physical network with radio access points. The network further supports the connectivity of the mobile network and user terminals through a multitude of connection options (e.g., multi-connectivity). The network is controlled (e.g., at least in part using a slicing controller 481) in such a way that the following are performed in an example.

A Radio Resource Control (RRC) function 445 controls the mapping of different logical mobile networks (slices) and their service flows to a number of radio flows which are delivered by a multi-connectivity enabled radio access network 420. This mapping is illustrated as slice-RSF mapping 440. Typically, the slicing controller 481 provides the mapping and the RRC has to implement (e.g., configure) the mapping within the RAN. Furthermore, as described above, the "MNC 470" may be thought of as a logical node which contains different functions, possibly including the RRC and/or NCS (as illustrated in FIG. 6). As described above, the MNC 470 could be cloud-based.

A Network Convergence Sublayer (NCS) 410 delivers user and control data from individual logical mobile networks to lower layer user and control data plane entities based on the mapping 440 set up by the RRC function. Note that NCS instances of different service flows are not necessarily co-located with each other and with RRC instances, and that radio frontend and upper layers of the radio network can be distributed according to different functional split configurations.

A slicing controller 481 has information about the service requirements of each slice and configures accordingly the MNC 470 or provides information to the MNC 470 in order to allow for configuring the radio access network 420, particularly for mapping service flows to multi-connectivity setups (e.g., the slices 410). The mapping 440 is based on information such as RAT types, geographical areas, QoS parameters (such as minimum bandwidth, packet latencies, reliability, and/or others), base station IDs, carrier frequencies, and multi-carrier configurations.

A mobile network as above may be further characterized in the following.

Each service flow 405 may be processed by an individual NCS instance 430.

Service flows 405 of two different slices 410 are assigned to at least two different NCS instances 430.

Each service flow 405 may be individually assigned to different radio subflows that are handled by individual air interface technologies (via the radio legs 425) based on the configuration set up by the slicing controller 481 and signaled by the RRC function 445. In general, an RSF is roughly equivalent to a radio bearer in 3GPP LTE, and "service flow" could be interpreted as "EPS bearer" in LTE. A "radio leg" is a connection between a UE and one radio access point, and one radio leg 425 may be one radio network to which a UE can connect to, i.e. different carrier frequencies, different 3GPP technologies, non-3GPP technologies, even different configurations within the same 3GPP technology, e.g. if the radio leg is differently implemented within a base station.

For each slice 410 at least one RRC signaling radio flow is set up.

The RRC function 445 maintains for each slice individual UE context data.

The RRC function 445 may maintain an individual UE connection state for each slice.

A security function in the RAN 420 may maintain a key database (see FIG. 5, described in more detail below) which allows for using individual security options for each slice 410. In particular two NCS instances 430 processing data from two different slices 410 may use two different keys for ciphering and integrity tests.

Further details are as follows. As illustrated by FIG. 4 it is possible to use the RRC function 445 and NCS 430 as anchor points of both multi-connectivity and mobile network slicing. This choice is taken because mobile network slicing within the radio access network 420 can make use of the diversity of technology options within the radio access network 420. In order to use this diversity, a technology is required which controls this multitude of radio access technologies available in the RAN (where a 5G radio leg corresponds to one radio access technology). This control could be part of a physical node called multi-node controller and is illustrated in FIG. 4 as the MNC 470 whose physical location may not be fixed. That is, the MNC 470 could be part of a physical base-station (e.g., an eNB) or located more centrally (e.g., as part of a CN). In particular, the MNC's location within a network may vary from deployment to deployment, however, once the location is set, it should not change in real time (of course, in a real deployment there should be redundancy mechanisms to make sure that in the case of failure, the MNC would be reassigned). The initial, one-time placement of the MNC is more likely, even though continuous relocation (e.g., real-time) might be possible. This technology managing multi-connectivity is now extended such that individual logical mobile networks (slices) are mapped to a multi-connectivity setup under considerations of the general connectivity and service requirements from each slice.

For instance, one UE 290 may be connected to two slices 410 (as in FIG. 4) where one slice (e.g., 410-1) provides high-reliability services while the second slice (e.g., slice 410-2) provides high-throughput services. A high-reliability service may be implemented through using primarily lower carrier frequencies, lower coding rates, high channel diversity through multiple antennas. A high-throughput service may rather prefer using high carrier frequencies, higher coding rates close to capacity bound, and less channel diversity but higher multiplexing gains from multiple antenna systems.

A controller such as the slicing controller 481, which is informed about the individual requirements of each slice, then may perform either of the following in an exemplary embodiment:

a) configure the RRC function 445 such that the individual radio subflows will satisfy the slice requirements, or b) provide the RRC function 445 with a set of policies which allows appropriate configuration of the multi-connectivity setup and according radio subflows while satisfying the defined requirements.

The set of policies may cover one or more of the following parameters:
RAT types;
geographical areas;
QoS parameters such as min. bandwidth, packet latencies, packet error rates, and the like;
protocol configurations (e.g., max. number of HARQ retransmission);

base station IDs, cell IDs, and other logical IDs which can be used for network selection, for example network slice IDs;
carrier frequencies;
multi-carrier configurations;
mobility information; and/or
access barring parameters and subscriber group information.

In order to support this setup, the RRC function 445 maps services from individual logical mobile networks to different service/radio flows (e.g., bearers in 3GPP LTE). Each service/radio flow is uniquely assigned to an NCS instance 430 which processes the data and may be differently configured. The corresponding mapping 440 may be performed using the following as examples:

User and control plane data originating from different logical mobile networks (e.g., the slices 410) are assigned to different radio flows such that one radio flow carries data from only one logical mobile network.

Radio flows (or SFs) are mapped to radio subflows which satisfy the connection requirements imposed by the individual slices 410. The setup of the individual radio subflows considering the available air interface technologies is done by the MNC 470. It is noted that there is a one-to-one mapping from radio flows to service flows.

The actual setup of the radio flows and radio subflows involving the user terminal is performed at RRC function 445, i.e., the user terminal (the UE 290) is aware of the individual mapping of slices to radio flows and radio subflows. In particular, the UE is informed through appropriate RRC signaling of the mapping, otherwise, the UE will not be able to map the received RSFs to the individual slices.

In a similar procedure for LTE-based networks, EPS bearers are mapped to radio bearers which may support dual connectivity configurations (i.e., split bearer, MCG bearer, SCG bearer) and are configured according to the policy mentioned above. EPS bearers may be connected to different network slices by using enhanced RAN-CN interface features such as the S1-Flex feature or DECOR (dedicated core networks).

For each slice 410, the RRC function 445 may maintain context data for each user terminal and for each slice, i.e., RRC states may be defined on the tuple (UE, slice). For instance, the RRC connection state may be IDLE for (UE1, slice A 410-1) and CONNECTED for (UE1, slice B 410-2). Therefore, slice-specific RRC messages are exchanged. This further implies that a user terminal which is connected to multiple slices also maintains for each slice its own RRC state. In order to ensure that control and user plane data can be correctly assigned to individual slices, service flows from different slices are eventually mapped to different logical and possibly physical channels. For instance, if a UE is connected to two different slices then the data originating from slice A 410-1 will be delivered through a dedicated transport channel uniquely assigned to slice A 410-1.

Alternatively, in certain configurations, e.g., if the network slices 410 are associated to different carrier frequencies or cell layers, dedicated RRC entities may be instantiated which perform mobility and state control independently from each other, e.g., per-UE and per slice (which refer to the tuple (UE, slice) used above), or only loosely coupled via coordination information. In this case, each RRC entity maintains its own UE context and state information.

Figure 5:
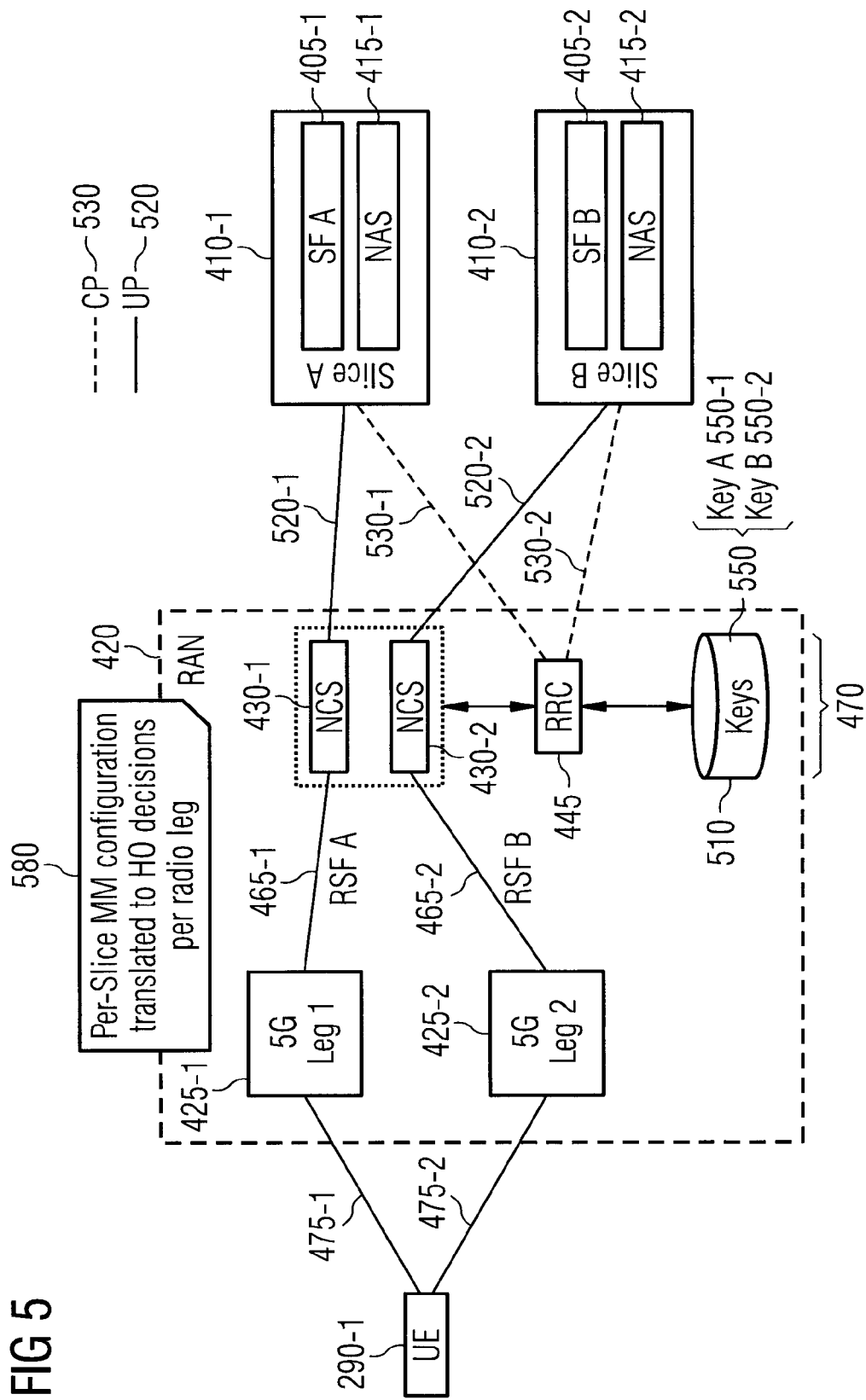
FIG. 5 is an example of key management for different RRC security contexts, in accordance with an exemplary embodiment.

For each slice 410, an individual RRC security context may be maintained (see FIG. 5) such that each RRC connection uses a different security key. FIG. 5 is an example of key management for different RRC security contexts. In addition to what has been previously described in reference to FIG. 4, FIG. 5 also shows a keys database 510 containing keys 550. The CP (control plane) 530, which includes CP 530-1 between slice A 410-1 and the RRC layer 445 and the CP 530-2 between the slice B 410-2 and the RRC layer 445, is shown. Additionally, the UP (user plane) 520, which includes UP 520-1 between slice A 410-1 and the NCS 430-1 and the UP 520-2 between the slice B 410-2 and the NCS 430-2, is also shown. The keys 550 may be managed at a RAN security function in the base station (or in a corresponding entity such as the MNC 470) and are derived from a NAS security context (see 3GPP, "TS 36.300 V12.8.0; Evolved Universal Terrestrial Radio Access (E-UTRA) and Evolved Universal Terrestrial Radio Access Network (E-UTRAN); Overall description", January 2016). Depending on the actual slice to which an RRC message corresponds, a different NCS instance 430 is used and therefore also a corresponding key is used. For instance, NCS instance 430-1 might use key A 550-1, while NCS instance 430-2 might use key B 550-2.

More specifically, the following steps may be performed (assuming that the UE sent network attachment requests to the corresponding logical mobile networks) in an exemplary embodiment:

A core network security function within each logical mobile network provides a key derivation procedure in order to derive an individual security/integrity key for each logical mobile network.

The RRC function 445 requests this security derivation function and associated keys 550 from all logical mobile networks to which the UE requests to connect. Based on this, the RRC function 445 derives one key for each logical mobile network. The same is performed by the UE 290 (as it is done today in the case of connecting to a single logical mobile network). That is, based on security information on the SIM card, the UE also derives a corresponding security context.

User and control plane data originating from or destined to a particular logical mobile network is then encrypted using the key provided for the individual slice.

Due to the unique mapping of data from one slice 410 to a set of logical channels, the UE 290 can identify the corresponding logical mobile network (e.g., slice 410) and therefore also the corresponding key 550.

This ensures an isolation of individual slices 410 on a cryptographic level such that security breaches across slices are avoided. Alternatively, a default slice 410 may be identified and the security context of this default slice is used in order to derive the radio access network security information. In this case, all slices would have the same security context within the radio access network, which reduces the complexity and management overhead within the radio access network 420 but also reduces the isolation between individual slices 410 within the radio access network 420.

FIG. 5 further illustrates in reference 580 that per-slice MM (mobility management) configuration is translated to HO decisions per radio leg (per 5G radio leg 425). Conflicting configurations (e.g., cell-individual offset, CIO) are resolved by the MNC.

Each slice 410 may still set up its own multi-connectivity connection (see FIG. 6). This may be required, for instance, to provide high robustness such as in the case of high mobility. In FIG. 6, which illustrates an example that MC (multi-connectivity) within each slice can be supported as well, the UE 290-1 receives via radio link 475-1 information based on the RSF A 465-1 that passes through 5G radio leg 1 425-1, and receives via radio link 475-2 information based on the RSF A 465-2 and the RSF B 465-3 that passes through 5G radio leg 1 425-2. In this example, the MC occurs because the SF A 405 from the slice A 410-1 is split into RFS A 465-1 and 465-2 and passes through two 5G radio legs 1 425-1 and 2 425-2. Compare this with FIG. 5, where each SF 405 passes only through a single 5G radio leg 425.

Each radio subflow may be implemented by a different software module (such as an instantiation of the CTL logic 450-2). Similarly, the individual air interfaces as well as the individual logical and physical channels may be implemented using different software modules. The correct instantiation of the software modules and their parameterization may be performed according to the requirements of the respective mapped service flow. The different software modules would be instantiated by the RAN and exist within the RAN 420. Logical and physical channels are defined within the RAN and are understood by each RAT and the UE. It may be that each RAT has a different set of logical and physical channels. Further, the slices 410 may have different sets of physical and logical channels.

Figure 7:
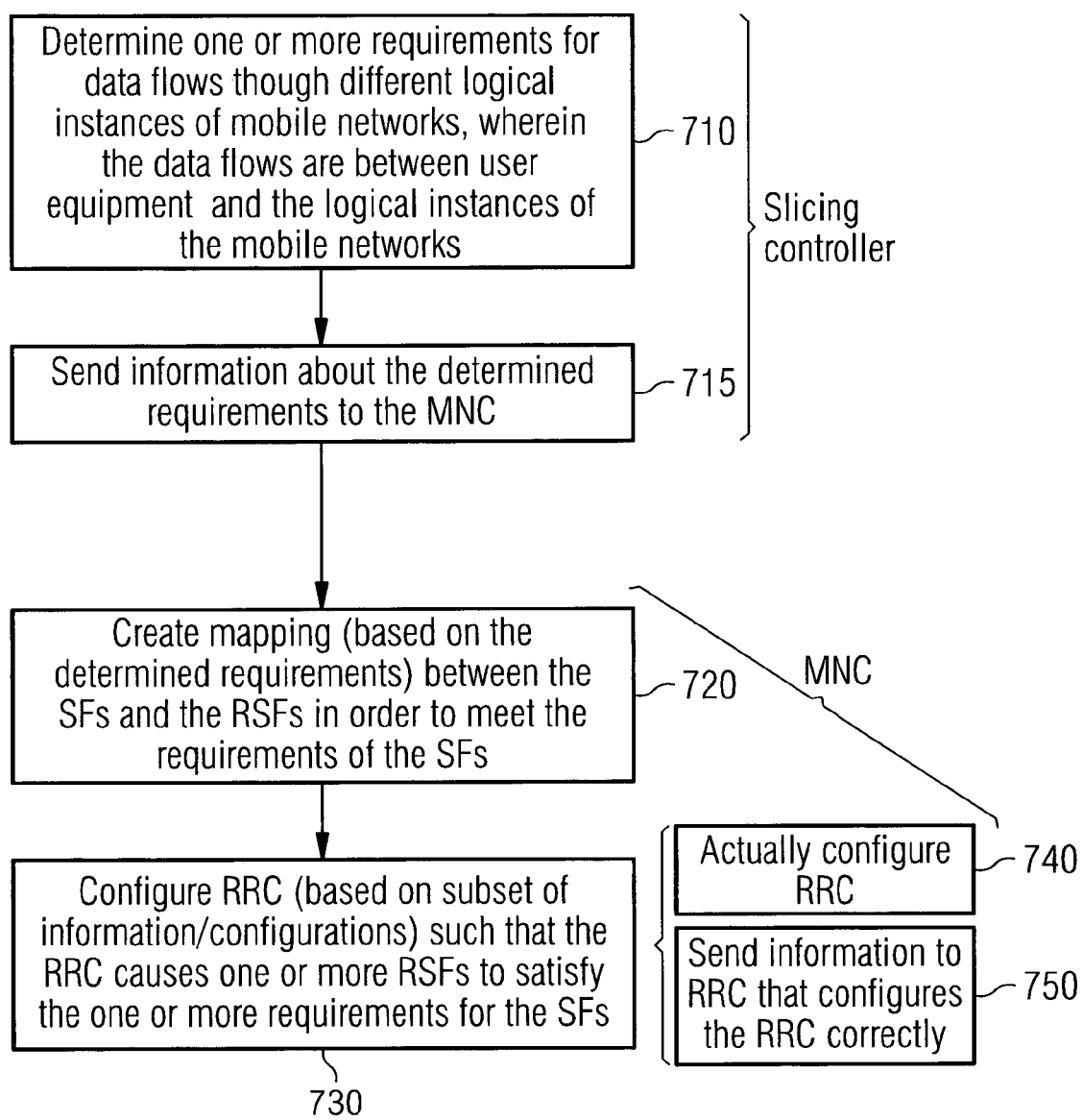
FIG. 7 is a logic flow diagram performed by a slicing controller and MNC for implementing radio access network slicing in a mobile network, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 7, this figure is a logic flow diagram performed by a slicing controller 481 and MNC 470 for implementing radio access network slicing in a mobile network. This figure illustrates the operation of an exemplary method, a result of execution of computer program instructions embodied on a computer readable memory, functions performed by logic implemented in hardware, and/or interconnected means for performing functions in accordance with exemplary embodiments. In an example, the slicing controller 481 may be controlled at least in part by, e.g., the CTL logic 450 of the device 471 of FIG. 4B. In other examples, the slicing controller 481 may be part of or co-located with one or both of the MNC 470 and/or RRC function 445. In another example, the MNC 470 may be controlled at least in part by, e.g., the CTL logic 450 of the device 471 of FIG. 4B and may be separate from the RRC function 445 or co-located with the RRC function 445. Blocks 710 and 715 are performed by the slicing controller 481. The blocks 720-750 are performed by the MNC 470.

In block 710, the slicing controller 481 determines one or more requirements for data flows though different logical instances of mobile networks, wherein the data flows are between user equipment and the logical instances of the mobile networks. In block 715, the slicing controller 481 sends information about the determined requirements to the MNC 470.

In block 720, the MNC 470 creates mapping 440 (based on subset of information/configurations) between the SFs 405 and the RSFs 465 in order to meet the requirements of the SFs 405. In block 730, the MN 470 configures RRC function 445 (e.g., based on subset of information/configurations) such that the RRC function 445 causes one or more RSFs 465 to satisfy the one or more requirements for the SFs 405. There are a number of ways for the MNC 470 to perform block 730. For instance, in block 740, the MNC 470 could actually configure RRC function 445. Alternatively (or possibly in addition), the MNC 470 could in block 750 send information to RRC function 445 that configures the RRC function 445 correctly.

Figure 8:
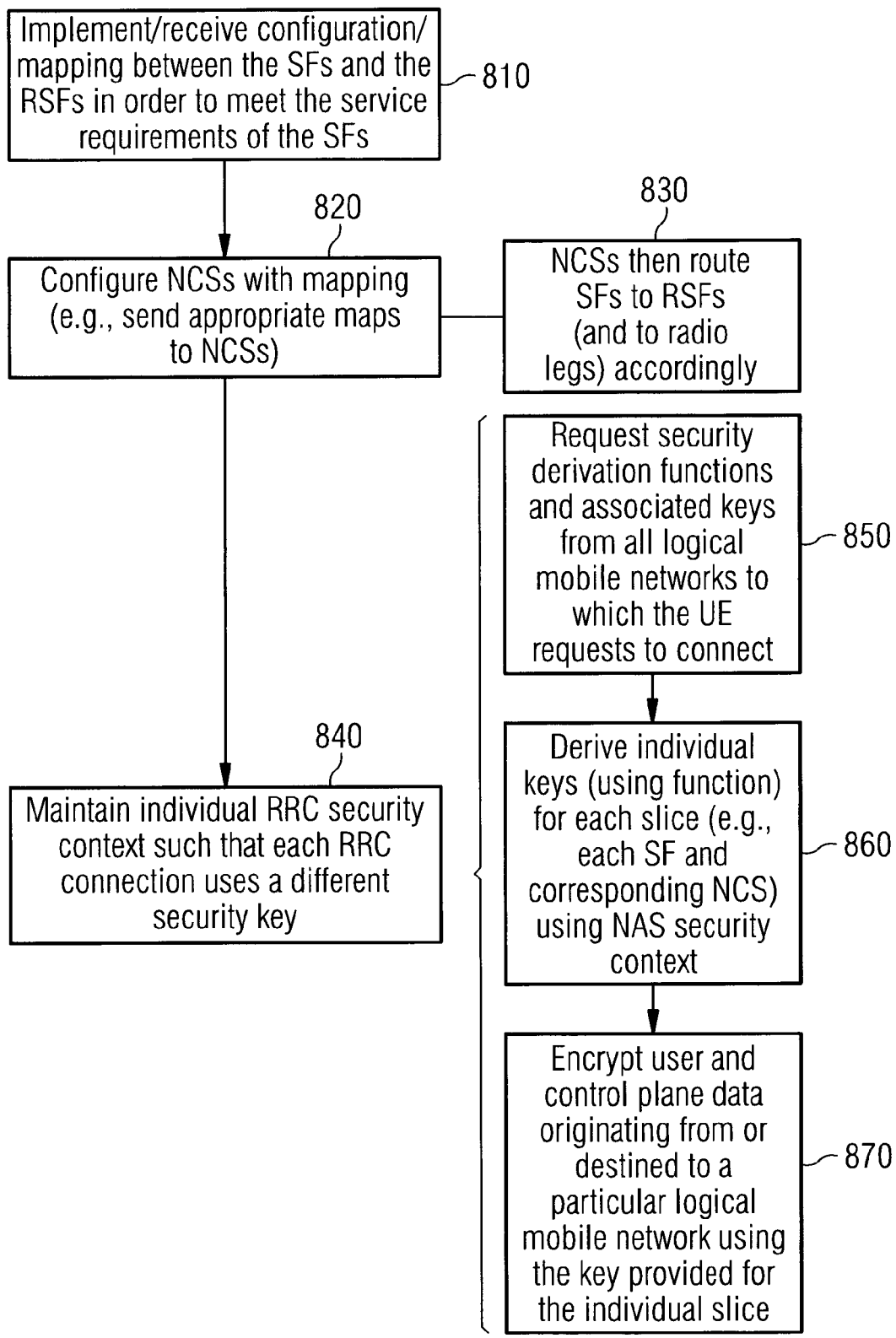
FIG. 8 is a logic flow diagram performed by radio resource control (e.g., and/or an MNC) for implementing radio access network slicing in a mobile network, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 8, this figure is a logic flow diagram performed by radio resource control (e.g., and/or an MNC) for implementing radio access network slicing in a mobile network. This figure further illustrates the operation of an exemplary method, a result of execution of computer program instructions embodied on a computer readable memory, functions performed by logic implemented in hardware, and/or interconnected means for performing functions in accordance with exemplary embodiments. The RRC function 445 (or MNC 470) may be implemented using the device 470 and its CTL logic 450. For ease of description, it will be assumed that the RRC function 445 performs the blocks in FIG. 8, but other implementations are possible.

The RRC function 445 in block 810 implements and receives configuration and mapping 440 between the SFs 405 and the RSFs 465 in order to meet the service requirements of the SFs 405. In block 820, the RRC function 445 configures NCSs 430 with mapping 440. For instance, the RRC function 445 may send (e.g., individual) appropriate maps to each NCSs or otherwise configure each NCS 430 with appropriate mapping. In block 830, the NCSs then routes SFs 405 to RSFs 465 (and to radio legs 425) accordingly.

In block 840, the RRC function 445 maintains individual RRC security context such that each RRC connection (e.g., slice 410 and its SF 405 or its corresponding radio flow) uses a different security key. Block 840 may be performed in a number of ways, and one such exemplary implementation is illustrated by blocks 850-870. In block 850, the RRC function 445 requests security derivation functions and associated keys from all logical mobile networks to which the UE requests to connect. The RRC function 445 in block 860 derives individual keys (using the requested and received security derivation function) for each slice (e.g., each SF and corresponding NCS) using NAS security context. In block 870, the RRC function 445 encrypts user and control plane data originating from or destined to a particular logical mobile network using the key provided for the individual slice.

Figure 9:
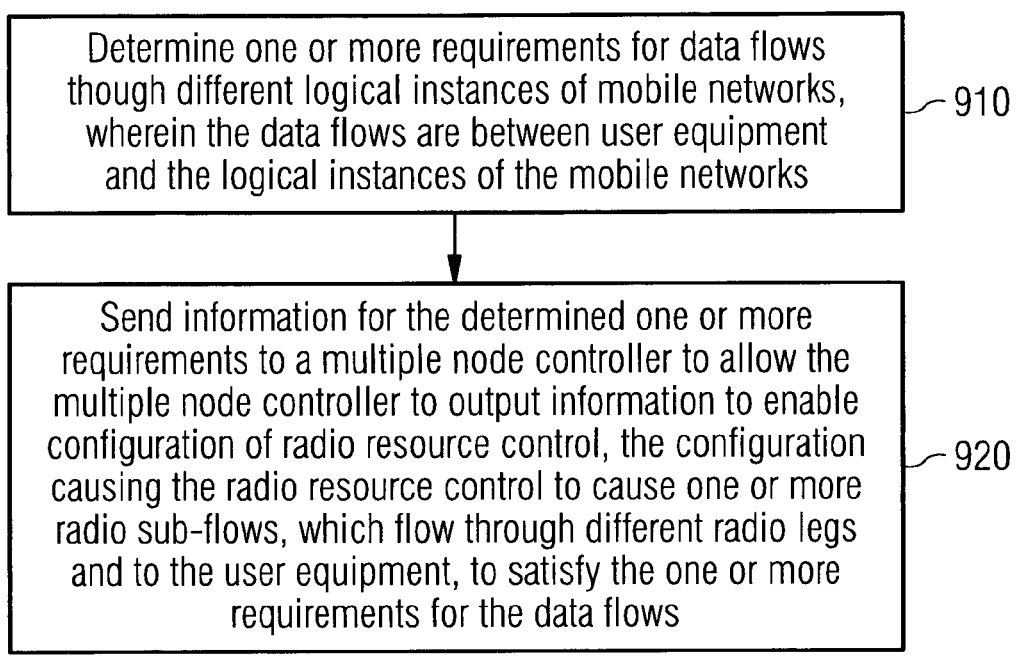
FIGS. 9, 10, and 11 are logic flow diagrams performed by a slicing controller, a MNC, and an RRC function, respectively, for implementing radio access network slicing in a mobile network, and illustrate the operation of an exemplary method, a result of execution of computer program instructions embodied on a computer readable memory, functions performed by logic implemented in hardware, and/or interconnected means for performing functions in accordance with exemplary embodiments.

FIG. 9 is a logic flow diagram performed by a slicing controller, MNC, and RRC, respectively, for implementing radio access network slicing in a mobile network, and illustrates the operation of an exemplary method, a result of execution of computer program instructions embodied on a computer readable memory, functions performed by logic implemented in hardware, and/or interconnected means for performing functions in accordance with exemplary embodiments. In an example, the slicing controller 481 may be controlled at least in part by, e.g., the CTL logic 450 of the device 471 of FIG. 4B. In other examples, the slicing controller 481 may be part of or co-located with one or both of the MNC 470 and/or RRC function 445.

In block 910, the slicing controller 481 determines one or more requirements for data flows though different logical instances of mobile networks, wherein the data flows are between user equipment and the logical instances of the mobile networks. In block 920, the slicing controller 481 sends information for the determined one or more requirements to a multiple node controller to allow the multiple node controller to output information to enable configuration of radio resource control. The configuration causes the radio resource control to cause one or more radio subflows, which flow through different radio legs and to the user equipment, to satisfy the one or more requirements for the data flows. In the examples that follow, the flow in FIG. 9 is referred to as example 1.

Is should be noted that it would be possible that in some cases, DRBs (e.g., radio subflows) may need to be remapped to network slices. This might be true, for instance, in case of mobility from a base station to another base station which supports not the same slices as the first one.

Figure 10:
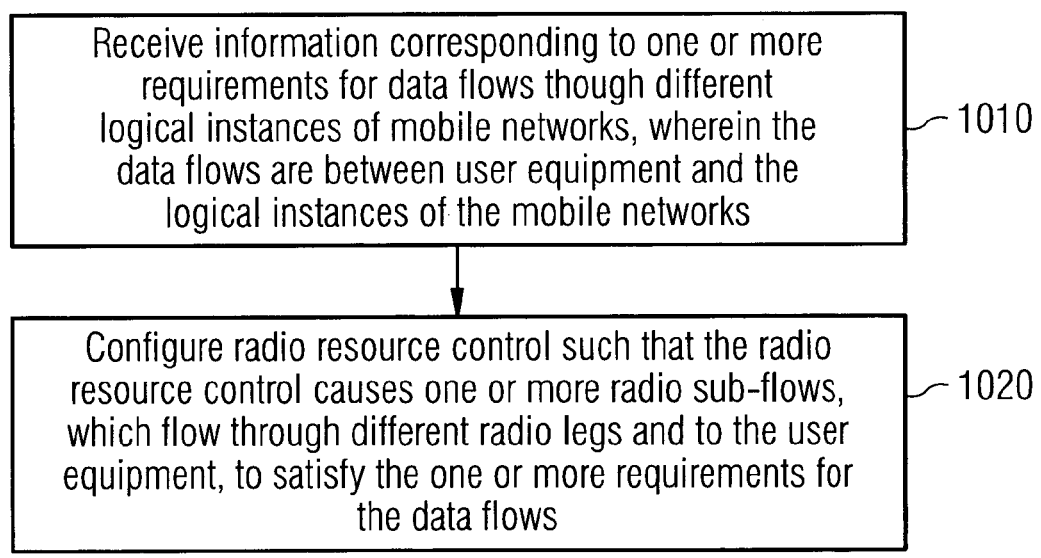

FIG. 10 is a logic flow diagram performed by a MNC for implementing radio access network slicing in a mobile network. FIG. 10 also illustrates the operation of an exemplary method, a result of execution of computer program instructions embodied on a computer readable memory, functions performed by logic implemented in hardware, and/or interconnected means for performing functions in accordance with exemplary embodiments. The MNC 470 may be controlled at least in part by, e.g., the CTL logic 450 of the device 471 of FIG. 4B and may be separate from the RRC function 445 or co-located with the RRC function 445.

In block 1010, the MNC 470 receives information corresponding to one or more requirements for data flows though different logical instances of mobile networks, wherein the data flows are between user equipment and the logical instances of the mobile networks. In block 1020, the MNC 470 configures radio resource control such that the radio resource control causes one or more radio subflows, which flow through different radio legs and to the user equipment, to satisfy the one or more requirements for the data flows.

Additional examples are as follows. The flow in FIG. 10 is referred to as example 2 in these examples.

Example 3

The method of example 2, wherein configuring further comprises providing the radio resource control with a set of policies, wherein in response to the policies being applied by the radio resource control, the policies cause the one or more radio subflows to satisfy the one or more requirements for the data flow.

Example 4

The method of example 3, wherein the set of policies cover one or more of the following parameters:
radio access technology types;
geographical areas;
quality of service parameters;
protocol configurations;
base station identifications, cell identifications, and other identifications such as network slice IDs which can be used for network selection;
carrier frequencies;
multi-carrier configurations;
mobility information; and
access barring parameters and subscriber group information.

Example 5

The method of any of examples 2 to 4, wherein the data flow comprises one of a service flow (SF) or an evolved packet system bearer, which both denote a logical end-to-end connection with specific service requirements.

Example 6

The method of any of examples 2 to 5, wherein the different radio legs comprise one or more of the following: different air interface technologies; different physical radio access points; and different carrier frequencies.

Example 7

The method of example 6, wherein the different physical radio access points use a same air interface technology or use different air interface technologies.

Example 8

The method of any of examples 2 to 7, wherein each of the different logical instances of the mobile networks corresponds to a different logical radio access network and wherein the radio resource control implements a physical radio access network that communicates wirelessly with the user equipment.

Example 9

The method of example 8, wherein at least two of the different radio access networks are controlled by different operators.

Example 10

The method of any of examples 2 to 9, further comprising causing the data flow and the one or more radio subflows to be uniquely assigned to and flow through a network convergence sublayer instance.

Example 11

The method of example 10, wherein:
there are a plurality of network convergence sublayer instances and multiple data flows for the user equipment, one data flow from each and only one of multiple logical instances of the mobile networks, and each data flow flows through only one of the plurality of network convergence sublayer instances;
receiving information further comprises receiving information for one or more requirements for each of the multiple data flows;
each data flow has a corresponding set of one or more radio subflows; and
configuring further comprises configuring the radio resource control such that the radio resource control causes each set of one or more radio subflows to satisfy the one or more requirements for the corresponding data flow.

Example 12

The method of any of examples 2 to 11, further comprising maintaining individual RRC security context such that each logical instance of a mobile network uses a different security key and the one or more radio subflows corresponding to a logical instance of a mobile network are assigned a same key as used by the corresponding logical instance of the mobile network.

Example 13

The method of any of examples 2 to 12, wherein configuring further comprises using mapping from logical instances and their associated service flows of the mobile networks to radio subflows in order to determine which one or more radio subflows correspond to which logical instances of the mobile networks.

Example 14

The method of any of examples 2 to 13, further comprising causing the different radio legs to communicate the radio subflows to the user equipment.

Example 15

The method of any of examples 2 to 14, performed by a multi-node controller that is located remotely from the radio resource control or co-located with the radio resource control.

Figure 11:
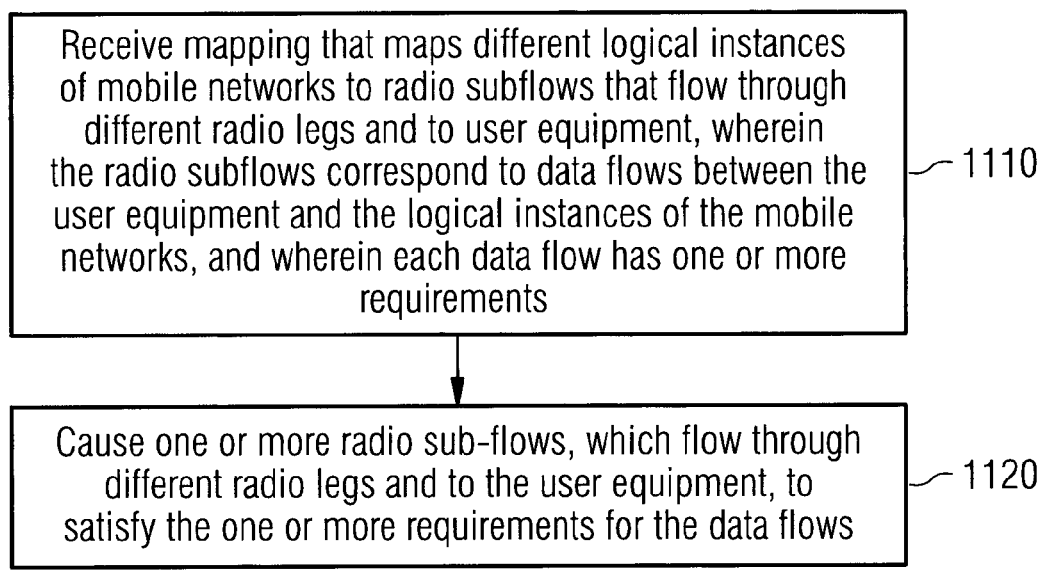

FIG. 11 is a logic flow diagram performed by an RRC function for implementing radio access network slicing in a mobile network. FIG. 11 also illustrates the operation of an exemplary method, a result of execution of computer program instructions embodied on a computer readable memory, functions performed by logic implemented in hardware, and/or interconnected means for performing functions in accordance with exemplary embodiments. The RRC function 445 may be controlled at least in part by, e.g., the CTL logic 450 of the device 471 of FIG. 4B.

In block 1110, the RRC function 445 receives mapping that maps different logical instances of mobile networks and their associated service flows to radio subflows that flow through different radio legs and to user equipment, wherein the radio subflows correspond to data flows between the user equipment and the logical instances of the mobile networks, and wherein each data flow has one or more requirements. In block 1120, the RRC function 445 causes one or more radio subflows, which flow through different radio legs and to the user equipment, to satisfy the one or more requirements for the data flows.

Additional examples are now presented. In these examples, the flow in FIG. 11 is referred to as example 16.

Example 17

The method of example 16, wherein causing further comprises configuring network convergence sublayers to create the radio subflows from the network convergence layers to the different radio legs to satisfy the one or more requirements for the data flows.

Example 18

The method of any of examples 16 or 17, wherein receiving further comprises receiving a set of policies, and wherein causing further comprises applying the policies to cause the one or more radio subflows to satisfy the one or more requirements for the data flow.

Example 19

The method of example 18, wherein the set of policies cover one or more of the following parameters:
radio access technology types;
geographical areas;
quality of service parameters;
protocol configurations;
base station identifications, cell identifications, and other identifications such as network slice IDs which can be used for network selection;
carrier frequencies;
multi-carrier configurations;
mobility information; and
access barring parameters and subscriber group information.

Example 20

The method of any of examples 16 to 19, wherein the data flow comprises one of a service flow (SF), or an evolved packet system bearer, or a PDU session, or a QoS flow, which denotes a logical end-to-end connection with specific service requirements.

Example 21

The method of any of examples 16 to 20, wherein the different radio legs comprise one or more of the following: different air interface technologies; different physical radio access points; and different carrier frequencies.

Example 22

The method of example 21, wherein the different physical radio access points use a same air interface technology or use different air interface technologies.

Example 23

The method of any of examples 16 to 22, wherein each of the different logical instances of the mobile networks corresponds to a different logical radio access network and wherein the radio resource control implements a physical radio access network that communicates wirelessly with the user equipment.

Example 24

The method of example 23, wherein at least two of the different radio access networks are controlled by different operators.

Example 25

The method of any of examples 16 to 24, further comprising causing the data flow and the one or more radio subflows to be uniquely assigned to and flow through a network convergence sublayer, or a PDCP instance, and/or a SDAP instance.

Example 26

The method of example 25, wherein:
there are a plurality of network convergence sublayer instances and multiple data flows for the user equipment, one data flow from each and only one of multiple logical instances of the mobile networks, and each data flow flows through only one of the plurality of network convergence sublayer instances;
receiving mapping further comprises receiving mapping for each of the multiple data flows;
each data flow has a corresponding set of one or more radio subflows; and
causing further comprises causing each set of one or more radio subflows to satisfy the one or more requirements for the corresponding data flow.

Example 27

The method of any of examples 16 to 26, further comprising maintaining individual RRC security context such that each logical instance of a mobile network uses a different security key and the one or more radio subflows corresponding to a logical instance of a mobile network are assigned a same key as used by the corresponding logical instance of the mobile network.

Example 28

The method of any of examples 16 to 27, wherein causing further comprises using the mapping in order to determine which one or more radio subflows correspond to which logical instances of the mobile networks.

Example 29

The method of any of examples 16 to 28, further comprising causing the different radio legs to communicate the radio subflows to the user equipment.

Example 30

The method of any of examples 16 to 29, performed by radio resource control.

Example 31

An apparatus, comprising:
means for determining one or more requirements for data flows though different logical instances of mobile networks, wherein the data flows are between user equipment and the logical instances of the mobile networks; and
means for sending information for the determined one or more requirements to a multiple node controller to allow the multiple node controller to output information to enable configuration of radio resource control, the configuration causing the radio resource control to cause one or more radio subflows, which flow through different radio legs and to the user equipment, to satisfy the one or more requirements for the data flows.

Example 32

An apparatus, comprising:
means for receiving information corresponding to one or more requirements for data flows though different logical instances of mobile networks, wherein the data flows are between user equipment and the logical instances of the mobile networks; and
means for configuring radio resource control such that the radio resource control causes one or more radio subflows, which flow through different radio legs and to the user equipment, to satisfy the one or more requirements for the data flows.

Example 33

The apparatus of example 32, further comprising means for performing any of the methods of examples 3 to 15.

Example 34

An apparatus, comprising:
means for receiving mapping that maps different logical instances of mobile networks to radio subflows that flow through different radio legs and to user equipment, wherein the radio subflows correspond to data flows between the user equipment and the logical instances of the mobile networks, and wherein each data flow has one or more requirements; and
means for causing one or more radio subflows, which flow through different radio legs and to the user equipment, to satisfy the one or more requirements for the data flows.

Example 35

The apparatus of example 34, further comprising means for performing any of the methods of examples 17 to 30.

Example 36

A communication system comprising at least one of the following: an apparatus of example 31; an apparatus of examples 32 or 33; and/or an apparatus of examples 34 or 35.

Example 37

A computer program comprising program code for executing the method according to any of examples 1 to 30.

Example 38

The computer program according to example 37, wherein the computer program is a computer program product comprising a computer-readable medium bearing computer program code embodied therein for use with a computer.

Example 39

An apparatus, comprising:
at least one processor; and
at least one memory including computer program code,
the at least one memory and the computer program code configured to, with the at least one processor, cause the apparatus to perform the method of any of examples 1 to 30.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memories 455 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
CN core network
CP control plane
CTL control
DRB data radio bearer
eNB (or eNodeB) evolved Node B (e.g., an LTE base station)
eUTRAN evolved universal (or UMTS) terrestrial radio access network
EPC evolved packet core
EPS evolved packet system
GGSN gateway GPRS support node
GWCN gateway core network
HARQ hybrid automatic repeat request
HetNet heterogeneous network
HO handover
ID identification
I/F interface
IoT Internet of things
LTE long term evolution
MAC medium access control
MBB mobile broadband
MC multi-connectivity
MCG master cell group
MeNB master eNB
MGC media gateway controller
MM mobility management
MME mobility management entity
MNC multi-node controller
MOCN multi-operator core network
MORAN multi-operator RAN
MNO mobile network operator
MVNO mobile virtual network operator
NAS non-access stratum
NCE network control element
NCS network convergence sublayer
N/W or NW network
OSS operating support system
PCRF policy and charging rules function
PDCP packet data convergence protocol
PDN packet data network
PDU protocol data unit
PGWs packet data network gateway
PLMN public land mobile network
QoE quality of experience
QoS quality of service
RAN radio access network
RAT radio access technology
Rel. release
RF radio frequency
RFL radio flow
RLC radio link control
RNC radio network controller
RRC radio resource control
RRH remote radio head
RSF radio subflow
Rx receiver
SAE-GW system architecture evolution-gateway
SCG secondary cell group
SDAP service data adaptation protocol
SF service flow
SeNB secondary eNB
SGSN serving GPRS support node
SGW serving gateway
SIB system information block
SIM subscriber identity module
SLA service level agreement
Tx transmitter
UE user equipment (e.g., a wireless, typically mobile device)
UP user plane
UMTS universal mobile telecommunications system
VLAN virtual local area network

What is claimed is:

1. A method, comprising:
receiving information corresponding to one or more requirements for data flows though different logical instances of mobile networks, wherein the data flows are between user equipment and the logical instances of the mobile networks;
configuring radio resource control such that the radio resource control causes one or more radio subflows, which flow through different radio legs and to the user equipment, to satisfy the one or more requirements for the data flows; and
maintaining individual security context such that each logical instance of a mobile network uses a different security key and the one or more radio subflows corresponding to a logical instance of a mobile network are assigned a same key as used by the corresponding logical instance of the mobile network.

2. The method of claim 1, wherein configuring further comprises providing the radio resource control with a set of policies, wherein in response to the policies being applied by the radio resource control, the policies cause the one or more radio subflows to satisfy the one or more requirements for the data flow.

3. The method of claim 2, wherein the set of policies cover one or more of the following parameters:
radio access technology types;
geographical areas;
quality of service parameters;
protocol configurations;
base station identifications, cell identifications, network slice identifications, and other identifications which can be used for network selection;
carrier frequencies;
multi-carrier configurations;
mobility information; and
access barring parameters and subscriber group information.

4. The method of claim 1, wherein the data flow comprises one of a service flow (SF) or an evolved packet system bearer, which both denote a logical end-to-end connection with specific service requirements.

5. The method of claim 1, wherein the different radio legs comprise one or more of the following: different air interface technologies; different physical radio access points; and different carrier frequencies.

6. The method of claim 5, wherein the different physical radio access points use a same air interface technology or use different air interface technologies.

7. The method of claim 1, wherein each of the different logical instances of the mobile networks corresponds to a different logical radio access network and wherein the radio resource control implements a physical radio access network that communicates wirelessly with the user equipment.

8. The method of claim 7, wherein at least two of the different radio access networks are controlled by different operators.

9. The method of claim 1, further comprising causing the data flow and the one or more radio subflows to be uniquely assigned to and flow through a network convergence sublayer instance.

10. The method of claim 9, wherein:
there are a plurality of network convergence sublayer instances and multiple data flows for the user equipment, one data flow from each and only one of multiple logical instances of the mobile networks, and each data flow flows through only one of the plurality of network convergence sublayer instances;
receiving information further comprises receiving information for one or more requirements for each of the multiple data flows;
each data flow has a corresponding set of one or more radio subflows; and
configuring further comprises configuring the radio resource control such that the radio resource control causes each set of one or more radio subflows to satisfy the one or more requirements for the corresponding data flow.

11. The method of claim 1, wherein configuring further comprises using mapping from logical instances of the mobile networks and their associated service flows to radio subflows in order to determine which one or more radio subflows correspond to which logical instances of the mobile networks.

12. The method of claim 1, further comprising causing the different radio legs to communicate the radio subflows to the user equipment.

13. The method of claim 1, performed by a multi-node controller that is located remotely from the radio resource control or co-located with the radio resource control.

14. A method, comprising:
receiving mapping that maps different logical instances of mobile networks to radio subflows that flow through different radio legs and to user equipment, wherein the radio subflows correspond to data flows between the user equipment and the logical instances of the mobile networks, and wherein each data flow has one or more requirements;
causing one or more radio subflows, which flow through different radio legs and to the user equipment, to satisfy the one or more requirements for the data flows; and
maintaining individual security context such that each logical instance of a mobile network uses a different security key and the one or more radio subflows corresponding to a logical instance of a mobile network are assigned a same key as used by the corresponding logical instance of the mobile network.

15. An apparatus, comprising:
at least one processor; and
at least one memory including computer program code,
the at least one memory and the computer program code configured to, with the at least one processor, cause the apparatus to perform operations comprising:
receiving information corresponding to one or more requirements for data flows though different logical instances of mobile networks, wherein the data flows are between user equipment and the logical instances of the mobile networks; and
configuring radio resource control such that the radio resource control causes one or more radio sub-flows, which flow through different radio legs and to the user equipment, to satisfy the one or more requirements for the data flow; and
maintaining individual security context such that each logical instance of a mobile network uses a different security key and the one or more radio subflows corresponding to a logical instance of a mobile network are assigned a same key as used by the corresponding logical instance of the mobile network.

16. An apparatus, comprising:
at least one processor; and
at least one memory including computer program code,
the at least one memory and the computer program code configured to, with the at least one processor, cause the apparatus to perform operations comprising:
receiving mapping that maps different logical instances of mobile networks to radio subflows that flow through different radio legs and to user equipment, wherein the radio subflows correspond to data flows between the user equipment and the logical instances of the mobile networks, and wherein each data flow has one or more requirements;
causing one or more radio subflows, which flow through different radio legs and to the user equipment, to satisfy the one or more requirements for the data flows; and
maintaining individual security context such that each logical instance of a mobile network uses a different security key and the one or more radio subflows corresponding to a logical instance of a mobile network are assigned a same key as used by the corresponding logical instance of the mobile network.

17. The apparatus of claim 15, wherein configuring further comprises providing the radio resource control with a set of policies, wherein in response to the policies being applied by the radio resource control, the policies cause the one or more radio subflows to satisfy the one or more requirements for the data flow.

18. The apparatus of claim 15, wherein each of the different logical instances of the mobile networks corresponds to a different logical radio access network and wherein the radio resource control implements a physical radio access network that communicates wirelessly with the user equipment.

19. The apparatus of claim 15, wherein configuring further comprises using mapping from logical instances of the mobile networks and their associated service flows to radio subflows in order to determine which one or more radio subflows correspond to which logical instances of the mobile networks.

20. The apparatus of claim 15, wherein the at least one memory and the computer program code are configured to, with the at least one processor, cause the apparatus to perform operations comprising: causing the different radio legs to communicate the radio subflows to the user equipment.

* * * * *